United States Patent [19]

Miskin et al.

[11] 4,419,688

[45] Dec. 6, 1983

[54] COLOR-TELEVISION RECEIVER WITH AT LEAST ONE DIGITAL INTEGRATED CIRCUIT FOR PROCESSING THE COMPOSITE COLOR SIGNAL

[75] Inventors: Leslie Miskin, Gundelfingen; Peter M. Flamm, Freiburg, both of Fed. Rep. of Germany

[73] Assignee: ITT Industries, Inc., New York, N.Y.

[21] Appl. No.: 311,218

[22] Filed: Oct. 14, 1981

[30] Foreign Application Priority Data

Oct. 3, 1980 [EP] European Pat. Off. ........ 80106654.9

[51] Int. Cl.³ ........................ H04N 9/535; H04N 9/49
[52] U.S. Cl. .................................. 358/27; 358/21 R; 358/24; 358/26
[58] Field of Search .................... 358/21 R, 23, 24, 25, 358/26, 27, 40, 18

[56] References Cited

U.S. PATENT DOCUMENTS

| | | | |
|---|---|---|---|
| 3,548,084 | 12/1970 | Kroner | 358/24 |
| 3,772,461 | 11/1973 | Horaguchi | 358/26 |
| 3,794,754 | 2/1974 | Haferl | 358/18 |
| 4,021,842 | 5/1977 | Campioni | 358/16 |
| 4,148,058 | 4/1979 | Harwood | 358/27 |
| 4,240,102 | 12/1980 | Groeneweg | 358/25 |
| 4,270,139 | 5/1981 | Flamm | 358/23 |
| 4,300,155 | 11/1981 | Sagishima | 358/24 |
| 4,352,123 | 9/1982 | Flamm | 358/21 R |

Primary Examiner—Tommy P. Chin
Attorney, Agent, or Firm—John T. O'Halloran; Alfred C. Hill; Donald J. Lenkszus

[57] ABSTRACT

The color television receiver includes a square-wave clock generator used as a chrominance subcarrier oscillator generating at least four clock signals, the first of which has a frequency four times the chrominance subcarrier frequency, and the second to fourth of which have a frequency equal to the chrominance subcarrier frequency, the first and second clock signals having a mark/space ratio of 1:1; a stage providing a digital chrominance signal, a first digital circuit having as one input signal the digital chrominance signal, and as another input signal the digital chroma control signal to provide a digital amplitude control of the received chrominance subcarrier wave; and a second digital circuit to provide digital PAL identification and color killer action and, if necessary, digital noise-dependent color killer action.

8 Claims, 2 Drawing Figures

COLOR-TELEVISION RECEIVER WITH AT LEAST ONE DIGITAL INTEGRATED CIRCUIT FOR PROCESSING THE COMPOSITE COLOR SIGNAL

BACKGROUND OF THE INVENTION

The present invention relates to color television receivers and more particularly to color television receivers having at least one digital integrated circuit for processing the composite color signal.

Color television receivers of this kind are described in German Patent DE-OS No. 2,854,236, and the composite color signal is regenerated therein by all-digital circuitry. To accomplish this, the color television receiver contains a square wave clock generator employed as a chrominance subcarrier oscillator for generating at least four clock signals. The first clock signal has a frequency four times the chrominance subcarrier frequency, while the three remaining clock signals have a frequency equal to the chrominance subcarrier frequency, with the first and second clock signals having a 1:1 mark/space ratio. The above-mentioned color television receiver further includes a stage providing the digital chrominance signal and a parallel multiplier whose two input signals are the digital chrominance signal and a digital chroma control signal.

In circuits of color television receivers using analog signal regeneration, the amplitude of the received chrominance subcarrier wave, which is contained in the so-called burst, is commonly maintained at the constant value. Such receivers contain a stage which determines whether the transmitted signal is a signal transmitted according to the PAL standard or not, in which latter case this signal is used for color killing, see for instance, the book by O. Limann, "Fernsehtechnik ohne Ballast," 12th edition, Munich 1978, pages 209 to 211, 220 and 221.

SUMMARY OF THE INVENTION

An object of the present invention is to provide a color television receiver enabling digital amplitude control of the received chrominance subcarrier wave, digital PAL identification and color killer action as well as digital chroma control with at least one digital integrated circuit for processing the composite color signal.

Another object of the present invention is to provide a color television receiver in which digital color killer action is provided even if the chrominance signal is too noisy.

A feature of the present invention is the provision of a color television receiver comprising a first digital circuit responsive to a received digital chrominance signal and a digital chroma control signal to control the amplitude of the received signal; a second digital circuit coupled to the first digital circuit to provide PAL identification and color killer action; and a third digital circuit coupled to the first and second digital circuits to provide a controlled digital chrominance signal.

The principal advantage of the present invention is that the all-digital signal processing largely eliminates the need for nonintegratable circuit elements, i.e., particularly coils and capacitors, and that the subcircuits can be preferably implemented using integrated insulated-gate field-effect transistor circuits, i.e., so-called MOS technology. This technology is better suited for implementing digital circuits than the so-called bipolar technology.

BRIEF DESCRIPTION OF THE DRAWING

Above-mentioned and other features and objects of this invention will become more apparent by reference to the following description taken in conjunction with accompanying drawing, in which.

DESCRIPTION OF THE PREFERRED EMBODIMENT

Figure 1:
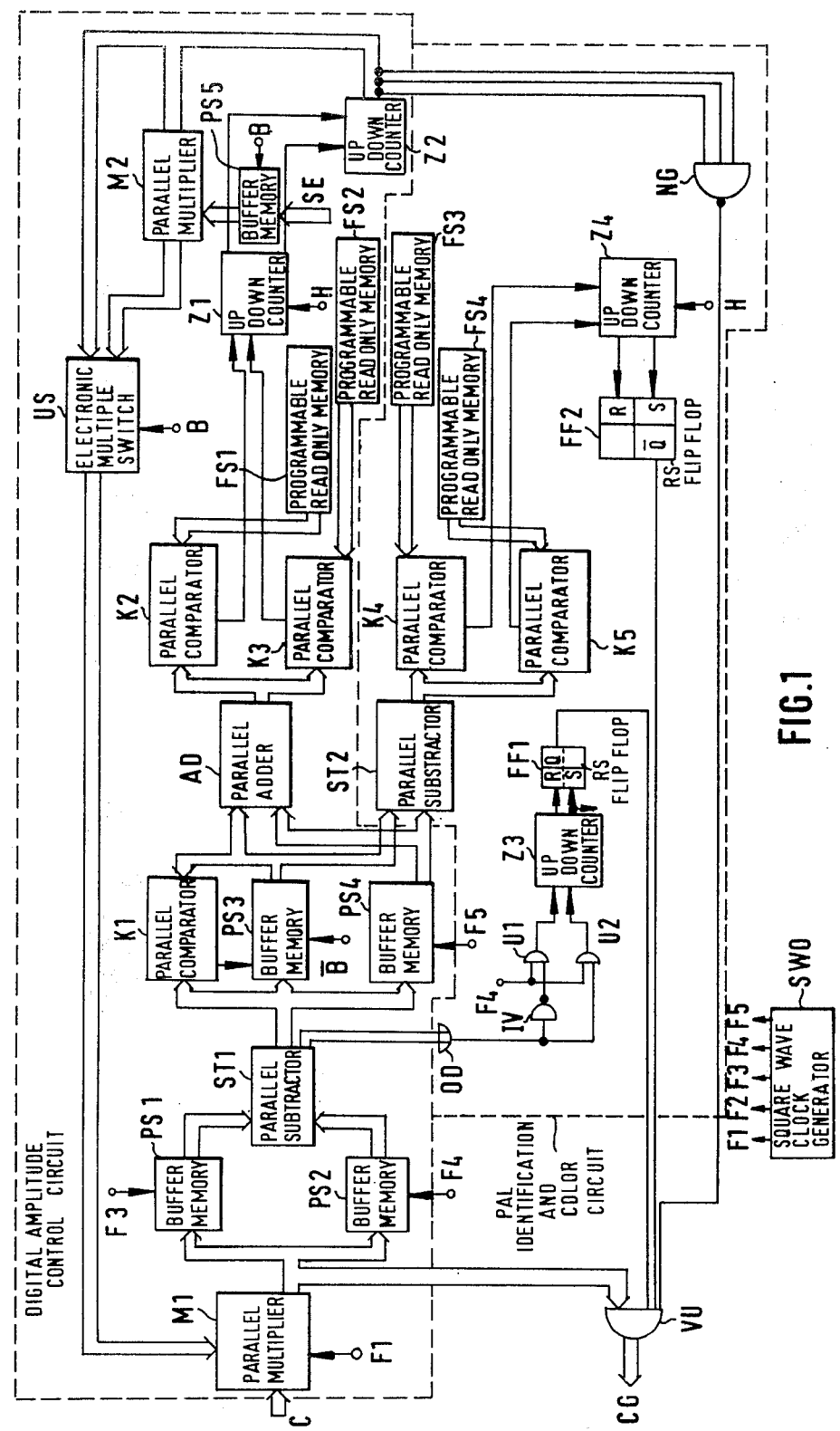
FIG. 1 is a block diagram of an embodiment of a color television receiver according to the principles of the present invention illustrating the digital amplitude control circuit, the digital PAL identification and color killer circuit as well as a digital chroma control circuit.

In FIG. 1, the digital chrominance signal C comes from a suitable stage, such as the one shown in FIG. 4 of the above-mentioned German patent, namely, the third binary arithmetic stage 30, which performs the function of a digital parallel subtracter. The digital chrominance signal C is applied to the first input of the parallel multiplier M1.

In the present description, the term "input" as used in connection with subcircuits designated "parallel" always means the parallel input to which a complete binary word with a corresponding number of bits is applied simultaneously, which is transferred in parallel into the subcircuit at a given time. Similarly, "output" as used in connection with such "parallel" subcircuits always means a parallel output at which all bits of the binary output word are available simultaneously. In FIG. 1, the lines interconnecting such "parallel" inputs and outputs are indicated by stripes, while the solid lines commonly used to indicate interconnections in discrete component circuits are used for interconnections over which only individual bits or clock signals and the like are transferred.

Figure 2:
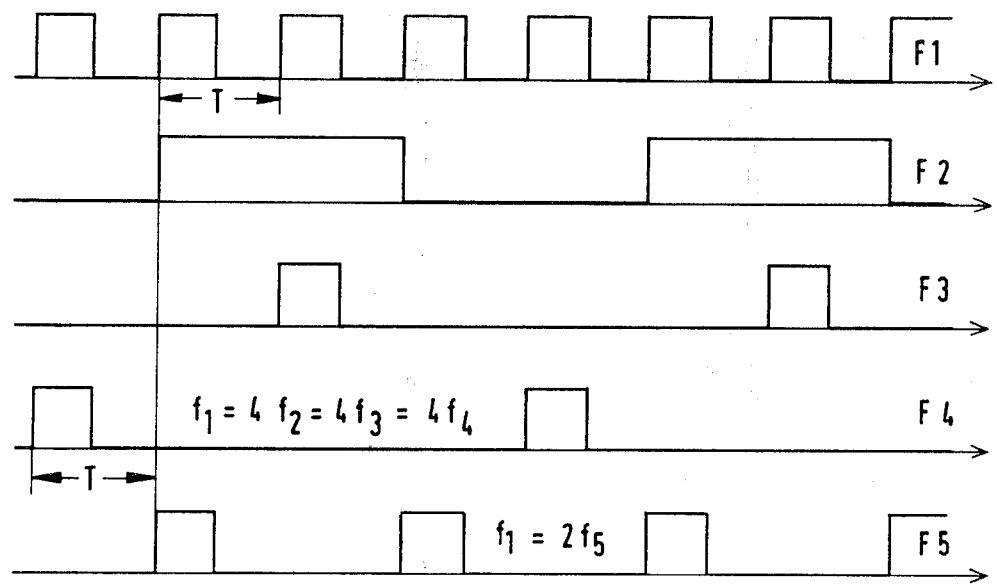
FIG. 2 shows the waveforms of the five clock signals employed in the receiver of FIG. 1.

In the invention, the chrominance subcarrier oscillator SWO generates the five clock signals shown in FIG. 2, with the fifth clock signal F5 having a frequency equal to twice the chrominance subcarrier frequency and having a mark/space ratio of 1:3. The first clock signal F1 has a frequency equal to four times the chrominance subcarrier frequency, and the second to fourth clock signals F2, F3, F4 have a frequency equal to the chrominance subcarrier frequency. The first and second clock signals F1 and F2 have a 1:1 mark/space ratio, while the third and fourth clock signals F3 and F4 have a mark/space ratio of 1:7 and are 180° out of phase with respect to each other. Leading edges of the first, second, and fifth clock signals F1, F2 and F5 coincide, while the leading edges of the fourth clock signal F4 lead those leading edges by the period T of the first clock signal F1. The corresponding relations for the frequencies $f_1$ to $f_5$ are given in FIG. 2 for clarity.

In FIG. 1, the output of the parallel multiplier M1 is connected to the inputs of the first and second buffer memories PS1 and PS2, the enable input of the first buffer memory PS1 being fed with the third clock signal F3, and the enable input of the second buffer memory PS2 being fed with the fourth clock signal F4, i.e., the binary output word of the parallel multiplier M1 is transferred into the two buffer memories with a relative shift of one-half period of the chrominance subcarrier frequency. The term "enable input" refers to an input which permits information to be written into the memory or stage only if an enabling or clock signal of appropriate form is applied thereto.

The outputs of the first and second buffer memories PS1 and PS2 are each connected to one of the two inputs of the parallel subtracter ST1. In accordance with the mathematical designations for the operands of the difference a−b (a=minuend, b=subtrahend), the two inputs of the first parallel subtracter ST1 are called "minuend input" and "subtrahend input," respectively. The output of the first buffer memory PS1 is thus connected to the the minuend input, and the output of the second buffer memory PS2 is connected to the subtrahend input. By the subtraction in the first parallel subtracter ST1 and the clocking of the two buffer memories PS1 and PS2, the amplitude of the chrominance subcarrier wave contained in the so-called burst is measured.

The output of the first parallel subtracter ST1 is connected to the minuend input of the first parallel comparator K1 and the inputs of the third and fourth buffer memories PS3 and PS4. The subtrahend input of the first parallel comparator K1 is connected to the output of the third buffer memory PS3, whose clear input is fed with the inverted burst gating signal B, which, together with the noninverting burst gating signal B, is derived in the same manner as in conventional color television receivers using analog signal regeneration. It is a pulse signal with a duration of about 4.5 $\mu$s (microseconds) and occurs in each line of the television picture when the burst occurs in the chrominance signal.

For the purposes of the present description, the two inputs of parallel comparators will be called "minuend input" and "subtrahend input," too, which is considered justifiable in view of the fact that, purely formally, the arithmetic operation performed by comparators is closer to subtraction than to addition by means of an adder even though the internal circuitry of comparaters is more similar to that of adders than to that of subtractors, for instance, the corresponding mathematical operations a−b, a≧b as contrasted with a+b.

The minuend-greater-than-subtrahend output of the first parallel comparator K1 is coupled to the enable input of the third buffer memory PS3, while the enable input of the fourth buffer memory PS4 is fed with the fifth clock signal F5.

The third buffer memory PS3, the maximum amplitude of the chrominance subcarrier wave contained in the burst is thus determined during each line, because information is transferred into it only if the first parallel comparator K1 determines that the input signal of the third buffer memory PS3 is greater than its output signal. Thus, the maximum amplitude of the chrominance subcarrier wave is stored there in digital form.

The output of the third buffer memory PS3 and that of the fourth buffer memory PS4 are connected, respectively, to the first and second inputs of the parallel adder AD. The output signal of the latter is thus the sum of the usually noisy output signal of the fourth buffer memory PS4 and the output signal of the third buffer memory PS3, which has been freed from noise. If the noise-free burst signal and the noise component are designated by BA and N, respectively, a sum signal of 2BA+N appears at the output of the parallel adder AD, i.e., the effect of the noise component is reduced by a factor of 2. A further reduction by a factor of 2 can be achieved by applying the output signal of the third buffer memory PS3 to the first input of the parallel adder AD with a shift of one bit, i.e., by adding the most-significant output bit of the third buffer memory PS3 to that bit of the parallel adder carrying the next lower value from the most-significant input bit.

The output of the parallel adder AD is connected to the minuend inputs of the second and third parallel comparators K2 and K3, while the subtrahend inputs of these two comparators are connected to the outputs of the first and second programmable read-only memories FS1 and FS2, respectively. These two read-only memories contain an upper reference value and a lower reference value, respectively, which determine the amplitude control. These reference values can be entered into the memories by the manufacturer of the color television receiver according to requirements.

The second and third parallel comparators K2, K3 determine whether the output signal of the parallel adder AD lies between the two reference values. If it lies outside these two reference values, i.e., if it is either too small or too large, corresponding signals will be applied to the first up-down counter Z1, which cause the counter to count up or down. To this end, the minuend-greater-than-subtrahend output of the second parallel comparator K2 is coupled to the count-up enable input of the first up-down counter Z1, and the minuend-smaller-than-subtrahend output of the third parallel comparator K3 is coupled to the count-down enable input of the counter Z1. The count input of the counter Z1 is fed with horizontal frequency pulses H, which are derived from the horizontal synchronizing pulses, for example. By applying a suitable logic operation to the signals at the two above-mentioned enable inputs and the zero state of the first up-down counter Z1, an "up" zero-crossing output and a "down" zero-crossing output are provided for this counter, i.e., a distinction is made as to whether the voltage is crossing through zero during forward counting or during backward counting.

The "up" zero-crossing output is connected to the up input of the second up-down counter Z2, and the "down" zero-crossing output is connected to the down input of this counter, i.e., the "up" and "down" zero crossings are counted in the forward direction and backward direction, respectively. The outputs of the second up-down counter Z2 are coupled to the first inputs of the second parallel multiplier M2 and the electronic multiple switch US, i.e., the binary word determined by the count of the second up-down counter Z2 is the input signal for the stages M2 and US.

The first up-down counter Z1 performs the function of a time-constant circuit, the time constant being given by the counter's capacity. In a practical circuit, in which the above-mentioned parallel interconnecting leads are generally designed for eight bits, the up-down counter Z1 has a count capacity of $2^{11}$.

The above-mentioned output signal of the second up-down counter Z2 is the amplitude control signal to be applied to the second input of the first parallel multiplier M1. This is done via the electronic multiple switch US, whose output is coupled to the second input of the first parallel multiplier M1. If the digital chrominance signal C applied to the first parallel multiplier M1 is an eight-bit signal as in the example being described, the amplitude control signal requires one bit less, i.e., seven bits; thus, the capacity of the second up-down counter Z2 is a $2^7$.

Connected to the second input of the second parallel multiplier M2 is the output of the fifth buffer memory PS5, whose input is fed with the chroma control signal SE in digital form which is derived in the manner described in the above cited German Patent. The burst gating signal B is applied to the enable input of the fifth buffer memory PS5. The output of the second parallel multiplier M2 is connected to the second input of the multiple switch US, whose control input is provided with the burst gating signal B. Thus, during the burst gating pulse, the output signal of the second up-down counter Z2 is transferred to the first parallel multiplier M1, thereby controlling the burst amplitude, while during the remainder of the line period, the output signal of the second up-down counter Z2, multiplied by the chroma control signal SE, is applied to the first parallel multiplier M1.

When the second clock signal F2 of chrominance subcarrier frequency is not in phase with received chrominance subcarrier wave, i.e., with the burst oscillations, the output signal of the first parallel subtracter ST1 is negative, which, by the way, is also the case if no burst signal is present. To sense the negative character, the minuend-equal-to-subtrahend output and the minuend-smaller-than-subtrahend output of the first parallel subtracter ST1 are linked via the OR gate OD, whose output signal is applied in inverted form through inverter IV to the first input of the first AND gate U1 and directly to the first input of the second AND gate U2. The second inputs of these two AND gates are fed with the fourth clock signal F4.

The outputs of the first and second AND gates U1 and U2 are coupled, respectively, to the up input and the down input of the third up-down counter Z3, whose function is to provide a time constant, too. Its "up" zero-crossing output is connected to the R input of the first RS flip-flop FF1, and its "down" zero-crossing output is connected to the S input of this flip-flop. When the second clock signal F2 and the burst wave have the correct phase relationship, the "up" zero-crossing output provides a pulse which resets the first RS flip-flop FF1 and thus, in positive logic, which is assumed in this embodiment, causes the binary value L, assigned to a low potential, to appear at the Q output of the flip-flop. Hence, the signal for the correct phase relationship between the second clock signal F2 and the burst wave is also the PAL identification signal. In case of nonsynchronism, the "down" zero-crossing output of the third up-down counter Z3 provides a pulse which activates the first RS flip-flop FF1 in the opposite direction and, thus, results at the Q output in a signal H, defined as the positive binary value, which is used to provide color killer action. To this end, the multiple-input AND gate VU is provided, to one input of which are applied some of the most significant bits of the output signal of the first parallel multiplier M1. In the above-mentioned practical example, these were five bits. By means of the multiple-input AND gate VU, each of these bits ANDed with the Q output of the first RS flip-flop FF1 and with the output of the NAND gate NG, to whose inputs are applied some of the most significant bits of the output signal of the second up-down counter Z2, i.e., the three most significant bits of this output signal in the embodiment of FIG. 1. By evaluating these three most significant bits, the color killer will also be triggered into operation if the amplitude of the amplitude control signal is large, which corresponds to a very small chrominance signal C.

With those subcircuits of the embodiment of FIG. 1 which are explained in the following, further color killer action dependent on the noise component of the chrominance signal is possible. One of these subcircuits is the second parallel subtracter ST2, whose minuend input is connected to the third buffer memory PS3, and whose subtrahend input is connected to the output of the fourth buffer memory PS4. Hence, only the above-mentioned noise component N occurs in the output signal of the second parallel subtracter ST2.

The output of the second parallel subtracter ST2 is coupled to the minuend inputs of the fourth and fifth parallel comparators K4, K5, whose subtrahend inputs are connected, respectively, to the outputs of the third and fourth programmable read-only memories FS3, FS4. These read-only memories hold a lower reference value and an upper reference value, respectively, which determine color killer action in the presence of noisy input signals and can be programmed by the manufacturer of the color television receiver. These two reference values can also be regarded as reference values for "killer action" and "no killer action," respectively.

The minuend-smaller-than-subtrahend output of the fourth parallel comparator K4 is connected to the count-up enable input of the fourth up-down counter Z4, and the minuend-greater-than-subtrahend output of the fifth parallel comparator K5 is connected to the count-down enable input of the counter Z4, whose count input is fed with horizontal frequency pulses H. Its "up" zero-crossing output and its "down" zero-crossing output are coupled, respectively, to the R input and the S input of the second RS flip-flop FF2, whose Q output is connected to a further input of the multiple-input AND gate VU, so that killer action will also be provided if the noise level is too high.

At the output of the multiple-input AND gate VU, the controlled chrominance signal CG is available in digital form as a parallel binary word.

The arrow at the "down" zero-crossing output of the third up-down counter Z3 is to indicate that a D flip-flop clocked via an additional OR gate whose other input is fed with the inverted burst gating pulses can be used to generate the PAL-switch control signal with the correct phase and at half the horizontal frequency.

While we have described above the principles of our invention in connection with specific apparatus, it is to be clearly understood that this description is made only by way of example and not as a limitation to the scope of our invention as set forth in the objects thereof and in the accompanying claims.

We claim:

1. A color television receiver comprising:
   a first digital circuit responsive to a received digital chrominance signal and a digital amplitude control signal produced automatically in said first digital circuit to control the amplitude of said received signal;
   a second digital circuit coupled to given ones of a plurality of outputs of said first digital circuit to provide PAL identification and color killer action; and
   a third digital circuit coupled to another output of said plurality of outputs of said first digital circuit and given ones of a plurality of outputs of said second digital circuit to provide a controlled digital chrominance signal.

2. A television receiver according to claim 1, further including:

a clock generator coupled to said first and second digital circuits to generate five clock signals, a first of said clock signals having a frequency equal to four times a chrominance subcarrier frequency, a second to fourth of said clock signals having a frequency equal to said subcarrier frequency and a fifth of said clock signals having a frequency equal to twice said subcarrier frequency, said first and second clock signals having a mark-space ratio of 1:1, said third and fourth clock signals having a mark-space ratio of 1:7 and are 180° out of phase with each other and said fifth clock signal having a mark-space ratio of 1:3, the leading edges of said first, second and fifth clock signals being coincident, while the leading edges of said fourth clock signal leads the leading edges of said first, second and fifth clock signals by an amount equal to a period of said first clock signal.

3. A television receiver according to claim 2, wherein said first circuit includes
   a first parallel multiplier having a first parallel input receiving said received signal, a second parallel input receiving an amplitude control signal and an enable input coupled to said clock generator responsive to said first clock signal,
   a first buffer memory having a parallel input coupled to a parallel output of said first multiplier and an enable input coupled to said clock generator responsive to said third clock signal
   a second buffer memory having a parallel input coupled to said parallel output of said first multiplier and an enable input coupled to said clock generator responsive to said fourth clock signal,
   a first parallel subtractor having a minuend input coupled to a parallel output of said first memory and a subtrahend input coupled to a parallel output of said second memory,
   a third buffer memory having a parallel input coupled to a parallel output of said first subtractor and a clear input responsive to an inverted first gating signal,
   a fourth buffer memory having a parallel input coupled to said parallel output of said first subtractor and an enable input coupled to said clock generator responsive to said fifth clock signal,
   a first parallel comparator having a minuend input coupled to said parallel output of said first subtractor, a subtrahend input coupled to a parallel output of said third memory and a minuend-greater-than-subtrahend output connected to an enable input of said third memory,
   a parallel adder having a first parallel input coupled to said parallel output of said third memory and a second parallel input coupled to a parallel output of said fourth memory,
   a second parallel comparator having a minuend input coupled to a parallel output of said adder and a subtrahend input coupled to a parallel output of a first programmable read-only memory,
   a third parallel comparator having a minuend input coupled to said parallel output of said adder and a subtrahend input coupled to a parallel output of a second programmable read-only memory,
   said first and second read-only memories storing an upper reference value and a lower reference value, respectively, to determine amplitude control,
   a first up-down counter having a count-up enable input coupled to a minuend-greater-than-subtrahend output of said second comparator, a count-down enable input coupled to a minuend-smaller-than-subtrahend output of said third comparator and a count input receiving horizontal frequency pulses,
   a second up-down counter having a count-up enable input coupled to an "up" zero-crossing output of said first counter and a count-down enable input coupled to a "down" zero-crossing output of said first counter,
   a fifth buffer memory having a parallel input receiving said digital chroma control signal and an enable input receiving a burst gating signal,
   a second parallel multiplier having a first parallel input coupled to a parallel output of said second counter and a second parallel input coupled to a parallel output of said fifth memory,
   an electronic multiple switch having a first parallel input coupled to said parallel output of said second counter, a second parallel input coupled to a parallel output of said second multiplier and a parallel output coupled to said second input of said first multiplier to provide said amplitude control signal.

4. A television receiver according to claim 3, wherein said second circuit includes
   an OR gate having a first input coupled to a minuend-equal-to-subtrahend output of said first subtractor and a second input coupled to a minuend-smaller-than-subtrahend output of said first subtractor,
   an inverter coupled to an output of said OR gate,
   a first AND gate having a first input coupled to an output of said inverter and a second input coupled to said clock generator responsive to said fourth clock signal,
   a second AND gate having a first input coupled to said output of said OR gate and a second input coupled to said clock generator responsive to said fourth clock signal,
   a third up-down counter having an up input coupled to an output of said first AND gate and a down input coupled to an output of said second AND gate,
   a first RS flip-flop having its R input coupled to an "up" zero-crossing output of said third counter, its S input coupled to a "down" zero-crossing output of said third counter and its Q output providing a PAL identification signal, and
   a NAND gate coupled to said second counter responsive to predetermined ones of the most significant bits at said output of said second counter to provide a color killer control signal.

5. A television receiver according to claim 4, wherein said third circuit includes
   a third AND gate having a plurality of inputs, certain ones of which are coupled to said first multiplier each receiving a different one of a predetermined number of the most significant bits of said parallel output of said first multiplier, another of said plurality of inputs coupled to said Q output of said first flip-flop and still another of said plurality of inputs coupled to an output of said NAND gate and an output to provide said controlled digital chrominance signal.

6. A television receiver according to claim 5, wherein said second circuit further includes
- a second parallel subtractor having a minuend input coupled to said third memory and a subtrahend input coupled to said fourth memory,
- a fourth parallel comparator having a minuend input coupled to a parallel output of said second subtractor and a subtrahend input coupled to a parallel output of a third programmable read-only memory,
- a fifth parallel comparator having a minuend input coupled to said parallel output of said second subtractor and a subtrahend input coupled to a parallel output of a fourth programmable read-only memory,
- said third and fourth read-only memories storing a lower reference value and an upper reference value, respectively, to determine color killer action in the presence of noisy input signals,
- a fourth up-down counter having a count-up enable input coupled to a minuend-smaller-than-subtrahend output of said fourth comparator, a count-down enable input coupled to a minuend-greater-than-subtrahend output of said fifth comparator and a count input receiving said horizontal pulses, and
- a second RS flip-flop having its R input coupled to an "up" zero-crossing output of said fourth counter, its S input coupled to a "down" zero-crossing output of said fourth counter and its $\overline{Q}$ output coupled to a further input of said third AND gate.

7. A television receiver according to claim 1 or 2, wherein
said second circuit includes
- an OR gate coupled to said first circuit responsive to two outputs therefrom indicative of the amplitude of said received signal,
- an inverter coupled to an output of said OR gate,
- a first AND gate having a first input coupled to an output of said inverter and a second input coupled to said clock generator responsive to said fourth clock signal,
- a second AND gate having a first input coupled to said output of said OR gate and a second input coupled to said clock generator responsive to said fourth clock signal,
- and up-down counter having an up input coupled to an output of said first AND gate and a down input coupled to an output of said second AND gate,
- a first RS flip-flop having its R input coupled to an "up" zero-crossing output of said third counter, its S input coupled to a "down" zero-crossing output of said third counter and its Q output providing a PAL identification signal, and
- a NAND gate coupled to said first circuit responsive at least to a predetermined portion of a digital amplitude control signal to provide a color killer control signal.

8. A television receiver according to claim 7, wherein said second circuit further includes
- a parallel subtractor coupled to said first circuit responsive to two signals, one of said two signals being related to the amplitude of said received signal and the other of said two signals being related to the maximum amplitude of said received signal,
- a first parallel comparator having a minuend input coupled to a parallel output of said subtractor and a subtrahend input coupled to a parallel output of a first programmable read-only memory,
- a second parallel comparator having a minuend input coupled to said parallel output of said subtractor and a substrahend intput coupled to a parallel output of a second programmable read-only memory,
- said first and second read-only memories storing a lower reference value and an upper reference value, respectively, to determine color killer action in the presence of noisy input signals,
- an up-down counter having a count-up enable input coupled to a minuend-smaller-than-subtrahend output of said first comparator, a count-down enable input coupled to a minuend-greater-than-subtrahend output of said second comparator and a count input receiving horizontal pulses, and
- a second RS flip-flop having its R input coupled to an "up" zero-crossing output of said counter, its S input coupled to a "down" zero-crossing output of said counter and its $\overline{Q}$ output providing a color killer control signal when said received signal is noisy.

* * * * *